ered July 18, 1967

3,331,856
METHOD OF PREPARING TRANS-HEXAHYDROINDANONES

Marinus Los, Trenton, N.J., assignor to American Cyanamid Company, Stamford, Conn., a corporation of Connecticut
No Drawing. Filed Apr. 16, 1964, Ser. No. 360,404
13 Claims. (Cl. 260—340.9)

This application is a continuation-in-part of my copending application Ser. No. 322,531, filed Nov. 8, 1963, now abandoned.

This invention relates to new organic compounds. More particularly, it relates to compounds useful in the synthesis of the steroid moiety and methods of preparing said compounds.

In the past several years, drug products for different purposes have been developed having in common the steroid structure. For the most parts starting materials for the preparation of these drugs have been obtained from vegetable sources such as the Mexican yam. These sources contain the steroid moiety as such, which is extracted, purified, etc. to obtain the starting material desired. The synthesis of the steroid molecule from similar substances has been accomplished. However, although the steroid art has developed rapidly in the past several years, it has become increasingly apparent that new and improved steroid intermediates and substantially improved processes for the preparation thereof are required if the art is to continue to advance.

In general, useful intermediates have been made available only with the utmost difficulty. Availability has hinged on the use of tedious time consuming processes, employment of elaborate isomer separation or recovery systems, and have required the use of rather expensive starting materials. Such problems are avoided or largely overcome by the process of the instant invention which provides high purity steroid intermediates in good yield from readily available, inexpensive, starting materials.

The present invention involves a number of steps from known compounds such as, 2-methylcyclohexane-1,3-dione to compounds such as 1-carboxy-8β-methyl-trans-hexahydroindanone-5. The conversion of the latter compound to steroid compounds has been described in J. Org. Chem. 28, pages 748–755 (1963). The present compounds are thus new intermediates useful in the synthesis of steroids made and sold for a variety of uses.

The instant invention involves reacting, for example, 2-lower alkylcyclohexane-1;3-dione (IA) with methylvinyl ketone in the presence of an alkali metal hydroxide in methanol followed by ring closure of the crude product in benzene with pyrrolidine to form 1,6-dioxo-Δ5(10)-9-lower alkyl-octalin (IB). This material (IB) is separated from the mixture and then treated with sodium borohydride (preferably purified) in alcohol, preferably ethanol, to form 1-hydroxy-6-oxo-Δ5(10)-9-lower alkyl-octalin (IC) which is separated from the mixture. This product (IC) is then converted to 1-acyloxy-6-oxo-Δ5(10)-9-lower alkyl cotalin (ID) by reaction of said material (IC) with an acyl anhydride, preferably acetic anhydride, and pyridine. This material (ID) is then separated from the reaction mixture. Reaction of 1-acyloxy-6-oxo-9-lower alkyl-Δ5(10)-octalin (ID) a lower alkyl orthoformate preferably ethyl orthoformate in the presence of a strong acid catalyst yields new enol ethers. When ethyl orthoformate is used, 1-acyloxy-6-ethoxy-9-lower alkyl-Δ4(10),5-hexahydronaphthalene (II) is formed in quantitative yield. The crude enol ether (II) is hydrogenated catalytically to the new compounds 1-acyloxy-6-lower alkoxy-9-lower alkyl-trans-Δ6-octalin (III) which without purification, is warmed with 50% aqueous acetic acid to give 1-acyloxy-6-oxo-9-lower alkyl-trans-decalin (IV) which is readily separated from a small amount of cis isomer by crystallization.

The crude 1-acyloxy-6-oxo-9-lower alkyl-trans-decalin compound (IV) is refluxed with ethylene glycol and p-toluenesulphonic acid in a solvent to form 1-acyloxy-6,6-ethylenedioxy-9-lower alkyl-trans-decalin (V) which in turn is converted to 6,6-ethylenedioxy-1-hydroxy-9-lower alkyl-trans-decalin (VI) by refluxing with an ethanolic solution of potassium hydroxide. Oxidation of 6,6-ethylene-dioxy-1-hydroxy-9-lower alkyl-trans-decalin (VI) with the Jones' Reagent produces the intermediate 6,6 - ethylene - dioxy - 1 - oxo - 9 - lower alkyl - trans-decalin (VII) which, when reacted with an alkyl nitrite and potassium t-butoxide in t-butanol, produces 6,6-ethylenedioxy-2-oximino-1-oxo-9-lower alkyl-trans-decalin (VIII). The latter product is isolated from the reaction mixture in high yield by neutralization, preferably with sodium dihydrogen phosphate, and extracting the product into a solvent such as ether. The purified product is transformed into the diazo-ketone, 6,6-ethylenedioxy-2-diazo-9-lower alkyl-1-oxo-trans-decalin (IX) by dissolving in alkali and reacting with chloramine. The diazo-ketone is readily separated from the reaction mixture by extraction of the reaction mixture with a solvent such as ether and this product need not be purified further since it can be changed to 1-carboxy-8β-lower alkyl-trans-hexahydroindanone-5 (X) by photolysis of the diazo-ketone in an aqueous-sodium bicarbonate system. On the other hand if the photolysis is carried out in an alcohol such as methanol, 1-carbalkoxy-5,5-ethylenedioxy-8β-lower alkyl-trans hexahydroindane (XI) is obtained which is convertible to (X) by base and acid hydrolysis.

In the above sequence, reactions from (IA) to (V) can best be carried out without the purification of any intermediates since (V) is readily crystallized and purified. Having obtained compound (V) the steps to compound (X) and the steroid moiety are readily carried out.

The following flowsheet describes the steps referred to above:

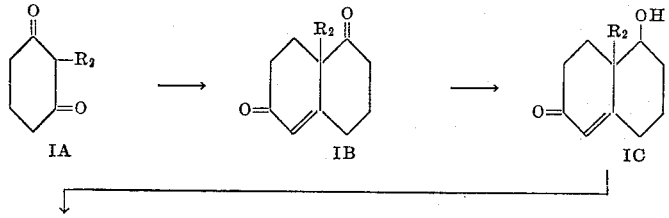

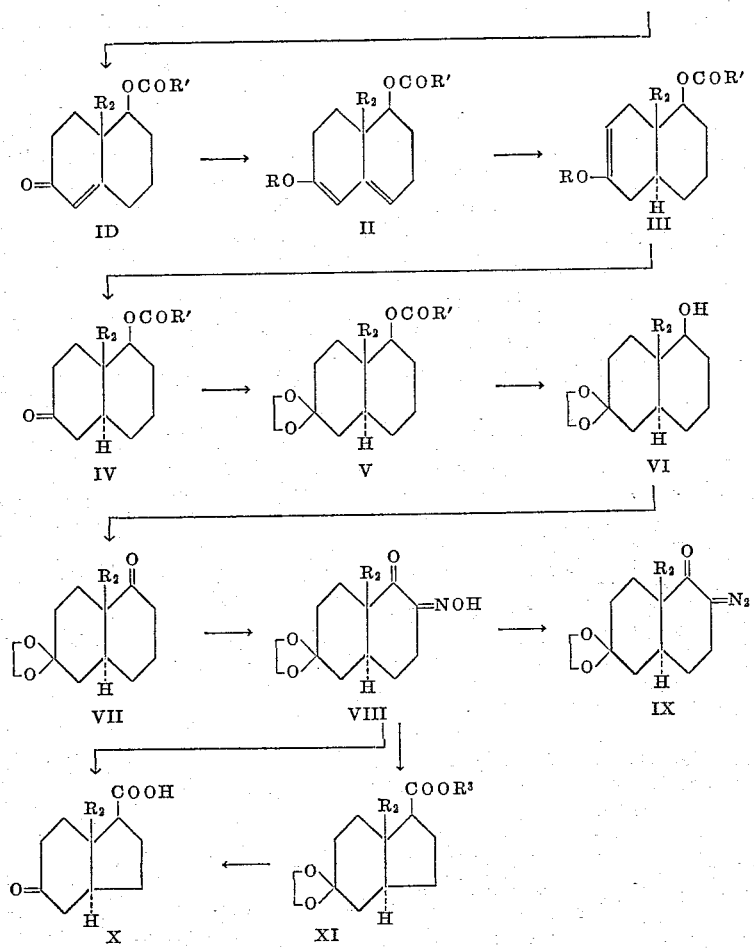

wherein R′ is lower alkyl, phenyl or substituted phenyl, R, R² and R³ are lower alkyl.

A publication, Birch, J. Chem. Soc., 4690 (1958) described a method for the preparation of 5-acetoxy-10-methyl-trans-decalone-2-(V) and recognized that said compound was an intermediate useful for the preparation of analogs of steroids. This process involves a reduction with lithium in anhydrous liquid ammonia. While successful, the process is not especially convenient and the yield and quality of the subject compound is inferior. Difficulties inherent in the lithium-liquid ammonia process, namely anhydrous conditions, lower solubility of lithium and the organic compound in liquid ammonia, are overcome by the process hereinbefore described.

The following examples describe in detail the preparation of representative compounds of the present invention.

EXAMPLE 1

Preparation of 1,6-dioxo-$\Delta^{5(10)}$-9-ethyl-octalin (IB)

A mixture of 70.0 g. 2-ethylcyclohexane-1;3-dione (IA), 62 ml. of methylvinyl ketone, 0.25 g. potassium hydroxide and 250 ml. absolute methanol are heated with stirring under reflux for 4 hours. Methanol and excess methylvinyl ketone are then removed by distillation at atmospheric pressure. Benzene is added to the residue and the distillation continued until the temperature of the vapours is 80° C. indicating complete removal of methanol and water. Benzene is added to bring the volume of the solution up to the original volume. The solution is cooled in an ice bath and 3 ml. pyrrolidine is added. The solution is heated at reflux under a Dean-Stark water separator for 1 hour when no more water is azeotropically distilling. The solution is cooled in ice and the product extracted with ether. The ether solution is washed with 100 ml. water containing 15 ml. of a 10% hydrochloric acid solution and again with 100 ml. water. The aqueous phases are combined and washed with 50 ml. ether. The combined organic phases are washed with three 100 ml. portions of water, saturated brine, dried and evaporated.

The residue is distilled. The main fraction boils at 130°–135° C. at 0.06 mm. The distillate is crystallized from ether-hexane to yield 46.7 g. of 1,6-dioxo-$\Delta^{5(10)}$-9-ethyl-octalin. The analytical sample obtained by recrystallization from ether-hexane melted 67.5–68.5° C.

The 1,6-dioxo-$\Delta^{5(10)}$-9-lower alkyl-octalins are prepared by substituting the other 2-lower alkylcyclohexane-1;3-diones, for the 2-ethyl-cyclohexane-1;3-dione in the above reaction. For example, the 1,6-dioxo-$\Delta^{5(10)}$-9-methyl-octalin and 1,6-dioxo-$\Delta^{5(10)}$-9-propyl-octalin are readily prepared by this procedure.

EXAMPLE 2

Preparaiton of 1-hydroxy-6-oxo-$\Delta^{5(10)}$-9-ethyl-octalin (IC)

To an ice-cold stirred solution of 9.6 g. of 1,6-dioxo-$\Delta^{5(10)}$-9-ethyl-octalin (IB) in 90 ml. absolute ethanol is added 200 mg. purified sodium borohydride. After 15 minutes, 200 mg. sodium borohydride is added and after a further 15 minutes, 160 mg. sodium borohydride. The stirring and cooling are continued for 15 minutes and then the solution is acidified with glacial acetic acid. The ethanol is removed under reduced pressure and the residue dissolves in chloroform and water. The aqueous phase is washed with chloroform and the combined organic phase washed with sodium bicarbonate solution, dried and evaporated. The residue is distilled, the product, 1-hydroxy-6-oxo-$\Delta^{5(10)}$-9-ethyl-octalin, boiling at 165° C. at 0.8 mm. The oil crystallizes and the analytical sample, melting point 88.0°–89.5° C. is obtained by recrystallization from acetone hexane.

By employing other 1,6-dioxo-$\Delta^{5(10)}$-9-lower alkyl-octalins in the above reaction, the corresponding 1-hydroxy- 6-oxo-$\Delta^{5(10)}$-9-lower alkyl-octalin is produced. For example, the corresponding -9-propyl-octalin, -9-butyl or isopropyl octalins may be prepared by this procedure.

EXAMPLE 3

*Preparation of 1-acetoxy-6-oxo-$\Delta^{5(10)}$-9-ethyl-octalin (ID)*

A mixture of 3.98 g. of 1-hydroxy-6-oxo-$\Delta^{5(10)}$-9-ethyl-octalin (IC), 10 ml. of acetic anhydride and 2 ml. pyridine are heated on a steam bath for 1.5 hours. The solution is then poured into 300 ml. iced water with stirring. After stirring for 1 hour, the aqueous mixture is extracted with ether and the ether washed with water saturated sodium bicarbonate solution, dried and evaporated. The 1-acetoxy-6-oxo-$\Delta^{5(10)}$-9-ethyl-octalin is obtained as a colorless oil, weighing 4.2 g. and is used without further purification.

The above reaction, when conducted with other 1-hydroxy-6-oxo-$\Delta^{5(10)}$-9-lower alkyl-octalins in presence of pyridine and the appropriate acyl anhydride or aroyl halide yields the corresponding 1-acyloxy-6-oxo-$\Delta^{5(10)}$-9-lower alkyl-octalins or 1-aroyloxy-6-oxo-$\Delta^{5(10)}$-9-lower alkyl-octalins.

EXAMPLE 4

*Preparation of 1-acetoxy-6-ethoxy-9-methyl-$\Delta^{4(10),5}$-hexahydronaphthalene (II)*

To a solution of 44.4 grams (0.2 mole) of 1-acetoxy-6-oxo-9-methyl-$\Delta^{5(10)}$-octalin (ID) in 44 ml. ethyl orthoformate, 4 ml. absolute ethanol and 200 ml. benzene is added 4 ml. of absolute ethanol saturated with hydrogen chloride and the mixture heated under refluxing conditions for 2 hours. The mixture is cooled, diluted with an equal volume of ether and poured into 300 ml. of 5% sodium hydroxide solution. After shaking thoroughly, the aqueous phase is discarded. The organic phase is washed with water, saturated brine, dried and the solvent evaporated. The residue, a yellow mobile oil, which can be crystallized to a colorless hygroscopic solid is essentially pure 1 - acetoxy - 6 - ethoxy-9-methyl-$\Delta^{4(10),5}$-hexahydronaphthalene (II) as determined spectroscopically. This material is used directly for the preparation of 1-acetoxy-6-ethoxy-9-methyl-trans-$\Delta^6$-octalin (III).

EXAMPLE 5

*Preparation of 1-acetoxy-6-ethoxy-9-ethyl-$\Delta^{4(10),5}$-hexahydronaphthalene (II)*

The crude 1-acetoxy-6-oxo-$\Delta^{5(10)}$-9-ethyl-octalin (4.2 g.) described in Example 3, 5.6 ml. ethyl-orthoformate, 1 ml. absolute ethanol, 1 ml. absolute ethanol saturated with hydrogen chloride and 100 ml. benzene are heated under reflux for 2 hours. The solution is cooled, diluted with ether and washed with 100 ml. of a 5% sodium hydroxide followed by washings with water and saturated brine. The organic phase is dried and evaporated to yield 1-acetoxy-6-ethoxy-9-ethyl-$\Delta^{4(10),5}$-hexahydronaphthalene (II) as a pale yellow oil weighing 4.7 g. This is used without further purification for the preparation of 1-acetoxy-6-ethoxy-$\Delta^6$-9-ethyl-trans-octalin (III).

While in the above Examples 4 and 5, ethyl-orthoformate is used, other orthoformates may be used such as methyl propyl, butyl and the like. Also other strong acid catalysts can be used such as sulfuric acid.

When 1-benzoyloxy, 1-toluoyloxy or 1-halo-benzoyloxy, -6-oxo-9-lower alkyl-$\Delta^{5(10)}$-octalin, prepared as for example, by reacting 1-hydroxy-6-oxo-9-lower alkyl-$\Delta^{5(10)}$-octalin with benzoyl-chloride or the like in pyridine, is substituted for 1-acetoxy-6-oxo-9-lower alkyl-$\Delta^{5(10)}$-octalin, the product of the reaction is the corresponding 1-benzoyloxy, 1-toluoyloxy or 1-halobenzoyloxy, -6-ethoxy-9-lower alkyl-$\Delta^{4(10),5}$-hexahydronaphthalene. When these starting materials are employed, the products III through V, illustrated on the flowsheet, have in the 1-position 1-benzoyloxy, 1-toluoyloxy or 1-halobenzoyloxy groups.

EXAMPLE 6

*Preparation of 1-acetoxy-6-ethoxy-9-methyl-trans-$\Delta^6$-octalin (III)*

The crude enol ether of Example 4 (from 6.7 grams 1-acetoxy-6-oxo-9-methyl-$\Delta^{5(10)}$-octalin) is dissolved in 150 ml. absolute ethanol and hydrogenated at room temperature and atmospheric pressure in the presence of 400 mg. of 2% palladium-on-strontium carbonate. One mole of hydrogen is absorbed in 2 hours. The catalyst is removed by filtration and the ethanol evaporated under reduced pressure. The crude residue of 1-acetoxy-6-ethoxy-9-methyl-trans-$\Delta^6$-octalin is used directly for the preparation of 1-acetoxy-9-methyl-6-oxo-trans-decalin of Example 7.

In the above reaction other hydrogenation catalysts may be used such as palladium on carbon, etc.

EXAMPLE 7

*Preparation of 1-acetoxy-6-ethoxy-9-ethyl-trans-$\Delta^6$-octalin (III)*

The crude 1-acetoxy-6-oxo-$\Delta^{5(10)}$-9-ethyl-octalin (4.7 g.) prepared as in Example 5 is dissolved in 200 ml. absolute ethanol and 1.0 g. of 2% palladium hydroxide on strontium carbonate added. The catalyst and compound are reduced with hydrogen at atmospheric pressure. One molar equivalent of hydrogen is absorbed. The catalyst is then removed by filtration and the solvent evaporated under reduced pressure. The residue consisting predominantly of 1-acetoxy - 6 - ethoxy-$\Delta^6$-9-ethyl - trans - octalin weighed 4.7 g. and was used without further purification.

Further, employing the procedures set forth in Examples 6 and 7 above and substituting an enol ether of the general formula:

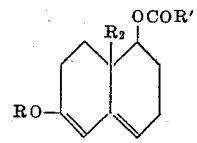

wherein $R_1$ and $R_2$ are lower alkyl, for the 1-acetoxy-6-ethoxy-9-methyl-$\Delta^{4(10),5}$-hexahydronaphthalene of Example 6 or the 1-acetoxy-6-ethoxy-9-ethyl-$\Delta^{4(10),5}$-hexahydronaphthalene of Example 7, and R′ is lower alkyl, phenyl or substituted phenyl, there is produced a compound of the formula:

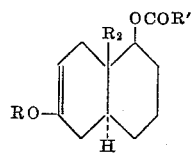

wherein R, R′ and $R_2$ are as described above.

EXAMPLE 8

*Preparation of 1-acetoxy-9-methyl-6-oxo-trans-decalin (IV)*

The crude 1-acetoxy-6-ethoxy-9-methyl-trans-$\Delta^6$-octalin (III) is warmed on the steam bath for 0.5 hour with 60 ml. 50% aqueous acetic acid. After cooling, the solution is diluted with water and extracted with ether. The ether is washed twice with water followed by saturated sodium bicarbonate solution. The organic phase is dried and the solvent evaporated. The residue is crystallized from a small volume of hexane to give 4.1 grams (61%) of 1-acetoxy-9-methyl-6-oxo-trans-decalin, melting point 46°–49° C.

EXAMPLE 9

*Preparation of 1-acetoxy-9-ethyl-6-oxo-trans-decalin (IV)*

The crude 1-acetoxy-6-ethoxy-Δ⁶-9-ethyl-trans-octalin (4.7 g.) prepared as in Example 8 is heated on a steam-bath with 20 ml. water and 20 ml. glacial acetic acid for 0.5 hour. The solution is cooled, diluted with water and extracted with ether. The ether is washed with water, saturated sodium bicarbonate solution, dried and evaporated. The residue of 1-acetoxy-9-ethyl-6-oxo-trans-decalin weighed 4.1 g. and is used without further purification.

Using the procedures provided in Example 8 or 9 above and reacting a compound of the formula:

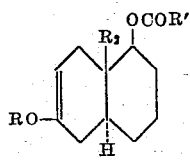

wherein R and $R_2$ are lower alkyl and R' is lower alkyl, phenyl or substituted phenyl radicals, with aqueous acetic acid will yield a compound of the formula:

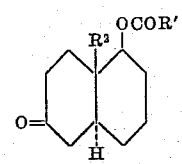

where R' and $R^2$ are as described above.

EXAMPLE 10

*Preparation of 1-acetoxy-6,6-ethylenedioxy-9-methyl-trans-decalin (V)*

The crude 1-acetoxy-9-methyl-6-oxo-trans-decalin derived from 16 grams crude 1-acetoxy-6-ethoxy-9-methyl-Δ⁴⁽¹⁰⁾,⁵-hexahydronaphthalene by the series of reactions described in Examples 6–8 without purification of any intermediates is heated in 250 ml. benzene containing 16 grams ethylene glycol and 200 mg. p-toluene-sulphonic acid under a Dean-Stark water separator for 4 hours. The cold benzene solution is diluted with 200 ml. ether and then washed successively with saturated sodium bicarbonate solution, water and saturated brine. After drying the organic phase, the solvents are removed under reduced pressure. The residue is diluted with an equal volume of hexane and kept at 0° C. overnight. The crystalline mass is removed by filtration and washed with 20 ml. cold hexane. Total yield of 1-acetoxy-6,6-ethylenedioxy-9-methyl-trans-decalin is 9.7 grams (57% based on enol ether of Example 4), melting point 116°–117° C. is obtained.

In the above reaction ethylene glycol is used to protect the keto group, however, other alcohols can be used such as propandiol.

EXAMPLE 11

*Preparation of 1-acetoxy-6,6-ethylene-9-ethyl-trans-decalin (V)*

A solution of crude 1-acetoxy-9-ethyl-6-oxo-trans-decalin (2.05 g.) prepared as in Example 9 dissolved in 100 ml. benzene containing 2.05 g. ethylene glycol and 100 mg. p-toluenesulphonic acid is heated under reflux under a Dean-Stark water separator until no more water is azeotropically removed (4.5 hours). The solution is cooled, diluted with ether and washed with saturated sodium bicarbonate solution. The organic phase is then washed with water followed by saturated brine, dried and the solvents removed under reduced pressure. The residue is crystallized from hexane to give 1-acetoxy-6,6-ethylenedioxy-9-ethyl-trans-decalin. The analytical sample obtained by recrystallizations of the product from acetone-hexane has a melting point 78.5°–79.5° C.

The compound of the formula:

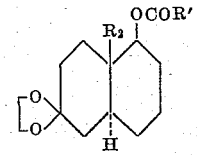

as exemplified by Examples 10 and 11, above, wherein $R_2$ is lower alkyl and R' is a lower alkyl, phenyl, or substituted phenyl are prepared by reacting a compound of the formula:

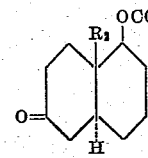

wherein R' and $R_2$ are as described above, with benzene, ethylene glycol and an acid such as p-toluenesulphonic acid.

EXAMPLE 12

*Preparation of 1-hydroxy-6,6-ethylenedioxy-9-methyl-trans-decalin (VI)*

A mixture of 10.72 grams (0.04 mole) of 1-acetoxy-6,6-ethylenedioxy-9-methyl-trans-decalin, 100 ml. ethanol and 50 ml. 2 N potassium hydroxide solution are heated under refluxing conditions for 2 hours. Most of the ethanol is removed by distillation under reduced pressure, the residue is diluted with water and extracted with ether. The ether is washed with water, saturated brine, dried and evaporated. The residue crystallizes completely to give 7.9 grams (84% yield) of 1-hydroxy-6,6-ethylenedioxy-9-methyl-trans-decalin, melting point 71°–72° C.

Using the procedure of this example and substituting a 1-acryloxy or 1-aroyloxy, -6-ethylenedioxy-9-lower alkyl-trans-decalin for 1-acetoxy-6,6-ethylenedioxy-9-methyl-trans-decalin will yield the corresponding 1-hydroxy-6,6-ethylenedioxy-9-lower alkyl-trans-decalin.

EXAMPLE 13

*Preparation of 6,6-ethylenedioxy-1-oxo-9-methyl-trans-decalin (VII)*

A solution of 1.13 grams (0.005 mole) of 1-hydroxy-6,6-ethylenedioxy-9-methyl-trans-decalin in 10 ml. reagent grade acetone is cooled to 0° C. with stirring and then 1.25 ml. of Jones' Reagent [J. Org. Chem. 21, 1547 (1956)] is added dropwise. After the addition, the solution is stirred for a further 10 minutes and then diluted with 75 ml. water. The aqueous solution is extracted with ether, the ether washed with water and saturated sodium bicarbonate solution, dried and evaporated. The residue is crystallized from hexane at −10° C. to give 0.93 gram (83% yield) of 6,6-ethylenedioxy-1-oxo-9-methyl-trans-decalin, melting point 49°–50° C.

The compounds 6,6-ethylenedioxy-1-oxo-9-lower alkyl-trans-decalin are prepared by the above process employing the corresponding 1-hydroxy-6,6-ethylenedioxy-9-lower alkyl-trans-decalin as a starting material.

EXAMPLE 14

*Preparation of 6,6-ethylenedioxy-1-oxo-2-oximino-9-methyl-trans-decalin (VIII)*

To a stirred solution of potassium t-butoxide, made from 0.5 gram of potassium and 20 ml. dry t-butanol, under nitrogen is added 1.55 grams 6,6-ethylenedioxy-1-oxo-9-methyl-trans-decalin and the mixture stirred at room temperature for 1 hour. Butyl nitrite (1.42 grams) is then added dropwise and the mixture stirred for a further 2 hours after which the mixture is allowed to stand at room temparature overnight in a stoppered flask. The reaction mixture is then diluted with water and extracted with ether. The ether is discarded. The aqueous phase is neutralized with 50 ml. of a 2.5 molar solution of sodium dihydrogen phosphate and extracted with ether. The ether is washed with water, saturated brine, dried and evaporated. The residue crystallize from ether to give 1.088 grams (62% yield) of 6,6-ethylenedioxy-1-oxo-2-oximino-9-methyl-trans-decalin. The purified product has a melting point of 171°–172° C.

Similarly, 6,6 - ethylenedioxy-1-oxo-2-oximino-9-lower alkyl-trans-decalins are prepared by the above process employing the corresponding 6,6-ethylenedioxy-1-oxo-9-lower alkyl-trans-decalin as the starting material.

EXAMPLE 15

*Preparation of 6,6-ethylenedioxy-2-diazo-1-oxo-9-methyl-trans-decalin (IX)*

To 0.506 gram (2 mmoles) of 6,6-ethylenedioxy-2-oximino-1-oxo-9-methyl-trans-decalin is added 14 ml. water and 2 ml. of 1 N sodium hydroxide. The solution is stirred and cooled to 2° C. and 0.27 ml. concentrated ammonia added. Then 6.7 ml. of a 5.25% sodium hypochlorite solution is added dropwise. The solution is stirred for a further 2 hours at 2° C. followed by 4 hours at room temperature. The solution is thoroughly extracted with ether, the ether washed with water and saturated sodium bicarbonate solution, dried and evaporated. Bands in the infrared spectrum at 2080 cm.$^{-1}$ and 1620 cm.$^{-1}$ of the product showed that the diazo-ketone is obtained.

Other 6,6 - ethylenedioxy-2-diazo-1-oxo-9-lower alkyl-trans-decalins can be prepared by the above procedure employing a corresponding 6,6-ethylenedioxy-2-oximino-1-oxo-9-lower alkyl-trans-decalin in places of 6,6-ethylenedioxy - 2 - oximino-1-oxo-9-methyl-trans-decalin.

EXAMPLE 16

*Preparation of 1-carboxy-8β-methyl-trans-hexahydroindanone-5 (X)*

The crude 6,6 - ethylenedioxy-2-diazo-1-oxo-9-methyl-trans-decalin from 1 gram 6,6-ethylenedioxy-2-oximino-1-oxo-9-methyl-trans-decalin is dissolved in 100 ml. purified tetrahydrofuran and 25 ml. water containing 2 grams sodium bicarbonate. The solution is placed in a quartz tube which contains a stirrer and cooling coil and the whole irradiated with ultraviolet light (low pressure mercury lamp). The solution becomes colorless in approximately 30 minutes. Most of the tetrahydrofuran is removed under reduced pressure and the aqueous residue is extracted with ether. The organic phase is discarded, the aqueous phase acidified with concentrated hydrochloric acid and extracted with methylene chloride. The organic phase is washed with water, saturated brine, dried and evaporated. The residue is crystallized from a mixture of acetone and hexane to yield 373 mg. (43% overall yield) of 1-carboxy-8β-methyl-trans-hexahydroindane-5, melting point 164°–165° C.

Following the above procedure and using other 6,6-ethylenedioxy - 2-diazo-1-oxo-9-lower alkyl-trans-decalins will give the corresponding 1-carboxy-8β-lower alkyl-trans-hexahydroindanone-5.

EXAMPLE 17

*Preparation of 1-carbomethoxy-5,5-ethylenedioxy-8β-methyl-trans-hexahydroindane (XI)*

Crude 6,6-ethylenedioxy-2-diazo-1-oxo-9-methyl-trans-decalin from 1 gram 6,6-ethylenedioxy-2-oximino-1-oxo-9-methyl-trans-decalin is dissolved in 125 ml. absolute methanol and irradiated with a cold-jacketed mercury lamp. After 20 minutes the solution becomes colorless, the methanol is evaporated and the residue (approximately 90% pure by vapor phase chromatography on a silicone gum rubber column at 200° C.) is identical with the product prepared from 1-carboxy-8β-methyl-trans-hexahydroindanone-5 by successive methylation with diazo-methane and ketalization with ethylene glycol. Saponification of this photolysis product by base followed by acidification gives 1-carboxy-8β-methyl-trans-hexahydroindanone-5.

Employing ethanol, propanol, butanol or the like and an appropriate 6,6-ethylenedioxy-2-diazo-1-oxo - 9 - lower alkyl-trans-decalin in the above procedure yields the corresponding 1 - lower carbalkoxy - 5,5 - ethylenedioxy - 8β-lower alkyl-hexahydroindane.

I claim:
1. A compound of the formula:

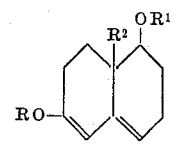

wherein R and R² are a lower alkyl radical and R¹ is an acyl radical selected from the group consisting of lower alkylcarbonyl, phenylcarbonyl, methylphenylcarbonyl and halophenylcarbonyl radicals.

2. A compound of the formula:

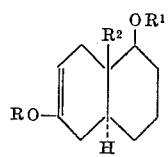

wherein R and R² are a lower alkyl radical and R¹ is an acyl radical selected from the group consisting of lower alkylcarbonyl, phenylcarbonyl, methylphenylcarbonyl and halophenylcarbonyl radicals.

3. 1-acetoxy-6-ethoxy-9 - methyl - $\Delta^{4(10),5}$ - hexahydronaphthalene.
4. 1-acetoxy-6-ethoxy-9 - ethyl - $\Delta^{4(10),5}$ - hexahydronaphthalene.
5. 1-acetoxy-6-ethoxy-9-methyl-$\Delta^6$-trans-octalin
6. 1-acetoxy-6-ethoxy-9-ethyl-$\Delta^6$-trans-octalin.
7. 1-acyloxy-6,6-alkylenedioxy - 9 - lower alkyl - trans-decalin, wherein said acyloxy radical is selected from the group consisting of lower alkylcarbonyloxy, phenylcarbonyloxy, methylphenylcarbonyloxy and halophenylcarbonyloxy radicals.
8. 1-acetoxy-6,6-ethylenedioxy-9-methyl-trans-decalin.
9. 1-acetoxy-6,6-ethylenedioxy-9-ethyl-trans-decalin.
10. 1-benzoyloxy-6,6-ethylenedioxy - 9 - methyl - trans-decalin.
11. 6,6 - ethylenedioxy-1 - hydroxy - 9-methyl - trans-decalin.
12. 6,6-ethylenedioxy-2 - oximino - 1 - oxo - 9 - methyl-trans-decalin.
13. 6,6-ethylenedioxy - 2 - diazo - 9 - methyl - 1 - oxo-trans-decalin.

References Cited

UNITED STATES PATENTS 3,058,999  10/1962  Huffman _____ 260—397.4
3,067,216  12/1962  Batres et al. _____ 260—239.55

(Other references on following page)

OTHER REFERENCES

Chaykovsky: Dissertation Abstract, vol. 22 (1962), pp. 2192 and 2193.

Cava et al.: Journal American Chem. Soc., vol. 84 (1962), pp. 115–116.

Meinwald et al.: Journal Amer. Chem. Soc., vol. 84 (1962), pp. 116–117.

Chaykovsky et al.: Journal of Organic Chem., vol. 28 (1963), pp. 748–55.

ALEX MAZEL, *Primary Examiner.*

J. H. TURNIPSEED, *Assistant Examiner.*